(12) United States Patent
Skogward

(10) Patent No.: US 6,327,931 B1
(45) Date of Patent: Dec. 11, 2001

(54) CONTROL DEVICE

(75) Inventor: Kenneth Skogward, Huskvarna (SE)

(73) Assignee: Kongsberg Automotive AB (SE)

( * ) Notice: Subject to any disclaimer, the term of this patent is extended or adjusted under 35 U.S.C. 154(b) by 0 days.

(21) Appl. No.: 09/445,851

(22) PCT Filed: Jun. 26, 1998

(86) PCT No.: PCT/SE98/01276

§ 371 Date: Mar. 13, 2000

§ 102(e) Date: Mar. 13, 2000

(87) PCT Pub. No.: WO99/00615

PCT Pub. Date: Jan. 7, 1999

(30) Foreign Application Priority Data

Jun. 27, 1997 (SE) .................................................. 9702508

(51) Int. Cl.⁷ .................................................... G05G 5/02
(52) U.S. Cl. .......................... 74/526; 74/469; 74/471 XY; 74/473.11; 74/473.12; 74/473.18; 74/473.21; 74/473.23; 74/491; 74/900; 188/353
(58) Field of Search .............................. 74/469, 471 XY, 74/473.11, 473.12, 473.18, 473.21, 473.23, 491, 526, 900; 188/353

(56) References Cited

U.S. PATENT DOCUMENTS 5,481,877  1/1996  Bakke et al. .
5,623,852  4/1997  Tischer et al. .
5,721,566 * 2/1998  Rosenberg et al. ............. 74/471 XY

FOREIGN PATENT DOCUMENTS 43 20 353 A1  1/1994  (DE) .
0179951 A1   5/1986  (EP) .
2 302 573 A   1/1997  (GB) .

* cited by examiner

Primary Examiner—Allan D. Herrmann
(74) Attorney, Agent, or Firm—Lerner, David, Littenberg, Krumholz & Mentlik, LLP

(57) ABSTRACT

Apparatus is disclosed for controlling the operational states of a motor vehicle comprising a maneuvering console including a maneuvering lever, a pivot hinge for the maneuvering lever so that the maneuvering lever can be actuated into a number of positions corresponding to the operational states of the motor vehicle, the pivot hinge being mounted to permit pivoting of the maneuvering lever with respect to the maneuvering console about an unlimited number of spatial pivot axes, a plurality of hydraulic pistons and cylinders mechanically coupled to the maneuvering lever for selectively limiting the pivoting movement of the maneuvering lever, a plurality of sensors for detecting a maneuvering force applied to the maneuvering lever and the position of the maneuvering lever so that the pivoting movement of the maneuvering lever can be selectively limited by the plurality of hydraulic pistons and cylinders based upon those detections, and a controller for controlling the plurality of hydraulic pistons and cylinders thereby permitting selective movement of the maneuvering lever based on control conditions set by the controller.

5 Claims, 9 Drawing Sheets

CONTROL DEVICE

FIELD OF THE INVENTION

The present invention relates to maneuvering apparatus comprising a maneuvering lever and a maneuvering console and provided with at least one pivot hinge by means of which the lever is articulated relative to the maneuvering console for switching between a number of maneuvering positions intended to be converted to corresponding operational states of a device which is to be maneuvered.

BACKGROUND OF THE INVENTION

For a general type of maneuvering apparatus, namely gear controls for motor vehicles, there are a number of known arrangements. These are generally designed in principle for a specific movement pattern, such as, for example, the gear controls for manual gearboxes or for automatic transmissions.

The object of the present invention is to provide a basic design for such maneuvering apparatus which can be used for several different types of maneuvering applications and movement patterns.

SUMMARY OF THE INVENTION

In accordance with the present invention, this and other objects have now been realized by the invention of apparatus for the control of the operational states of a device comprising a maneuvering console including a maneuvering lever, a pivot hinge for the maneuvering lever whereby the maneuvering lever can be actuated into a plurality of positions corresponding to the operational states of the device, the pivot hinge being mounted to permit pivoting of the maneuvering lever with respect to the maneuvering console about an unlimited number of spatial pivot axes, a plurality of controllable units mechanically coupled to the maneuvering lever for selectively limiting the pivoting movement of the maneuvering lever, a plurality of sensors for detecting a maneuvering force applied to the maneuvering lever and the position of the maneuvering lever, whereby the pivoting movement of the maneuvering lever can be selectively limited by the plurality of controllable units based on the detections, and a controller for controlling the plurality of controllable units thereby permitting selected movement of the maneuvering lever based on control conditions set by the controller. In a preferred embodiment, the plurality of controllable units comprises at least two hydraulic pistons and cylinders, a first hydraulic line connecting the at least two hydraulic pistons and cylinders and a first flow limiter disposed in the first hydraulic line, the maneuvering lever being mechanically coupled to each of the at least two hydraulic pistons and cylinders, whereby the pivoting movement of the maneuvering lever is converted into reciprocal movement of the hydraulic pistons within the cylinders. In accordance with a preferred embodiment, the plurality of controllable units comprises four hydraulic pistons and cylinders, and includes a second hydraulic line connecting at least two other of the hydraulic pistons and cylinders, a second flow limiter disposed in the second hydraulic line, and a joint cross for mechanically coupling the maneuvering lever to the four hydraulic pistons and cylinders, the joint cross being mounted with respect to the maneuvering console for pivoting about a pair of pivot axes set at right angles with respect to each other.

In accordance with a preferred embodiment of the apparatus of the present invention, the plurality of sensors includes a plurality of position sensors for detecting the position of the maneuvering lever and a plurality of pressure sensors for detecting the hydraulic pressure in the first and second hydraulic lines on both sides of the first and second flow limiters.

In accordance with another embodiment of the apparatus of the present invention, the apparatus includes a plurality of hydraulic control cylinders coupled in parallel to each other and connected to the first hydraulic line, and a pair of spring-loaded control pistons disposed within the pair of hydraulic control cylinders in opposite directions, whereby the maneuvering lever can be switched between a first mode and a second mode wherein the maneuvering lever can be automatically set to a neutral position.

The objects of the present invention can be achieved by means of a maneuvering apparatus, which includes a pivot hinge arranged to permit pivoting of the maneuvering lever relative to the maneuvering console about an unlimited number of spatial pivot axes, and in which the maneuvering apparatus comprises, on the one hand, a number of controllable devices which are mechanically coupled to the maneuvering lever and which limit the pivoting movement of the maneuvering lever, and, on the other hand, a number of sensor members arranged to detect a maneuvering force initiated on the lever and a maneuvering position of the lever and to control the devices so as to permit a selected movement as a function of control conditions established by means of a control unit.

BRIEF DESCRIPTION OF THE DRAWINGS

The present invention will be more readily understood with reference to the following detailed description which, in turn, refers to the attached drawings, in which.

DETAILED DESCRIPTION

The underlying concept on which the present invention is based is that the maneuvering lever included in the maneuvering apparatus is mounted freely in the maneuvering apparatus by a pivot hinge which is of a type such that the lever can be allowed to pivot in an unlimited number of directions, i.e. about an unlimited number of pivot axes, but is limited by movement-limiting devices which are controllable, on the one hand, by means of a number of sensor members and, on the other hand, in accordance with an established movement pattern. These sensor members are arranged to detect a maneuvering force initiated on the lever and the position of the lever, and to control the movement-limiting devices in such a way that the selected movement is permitted.

Figure 1:
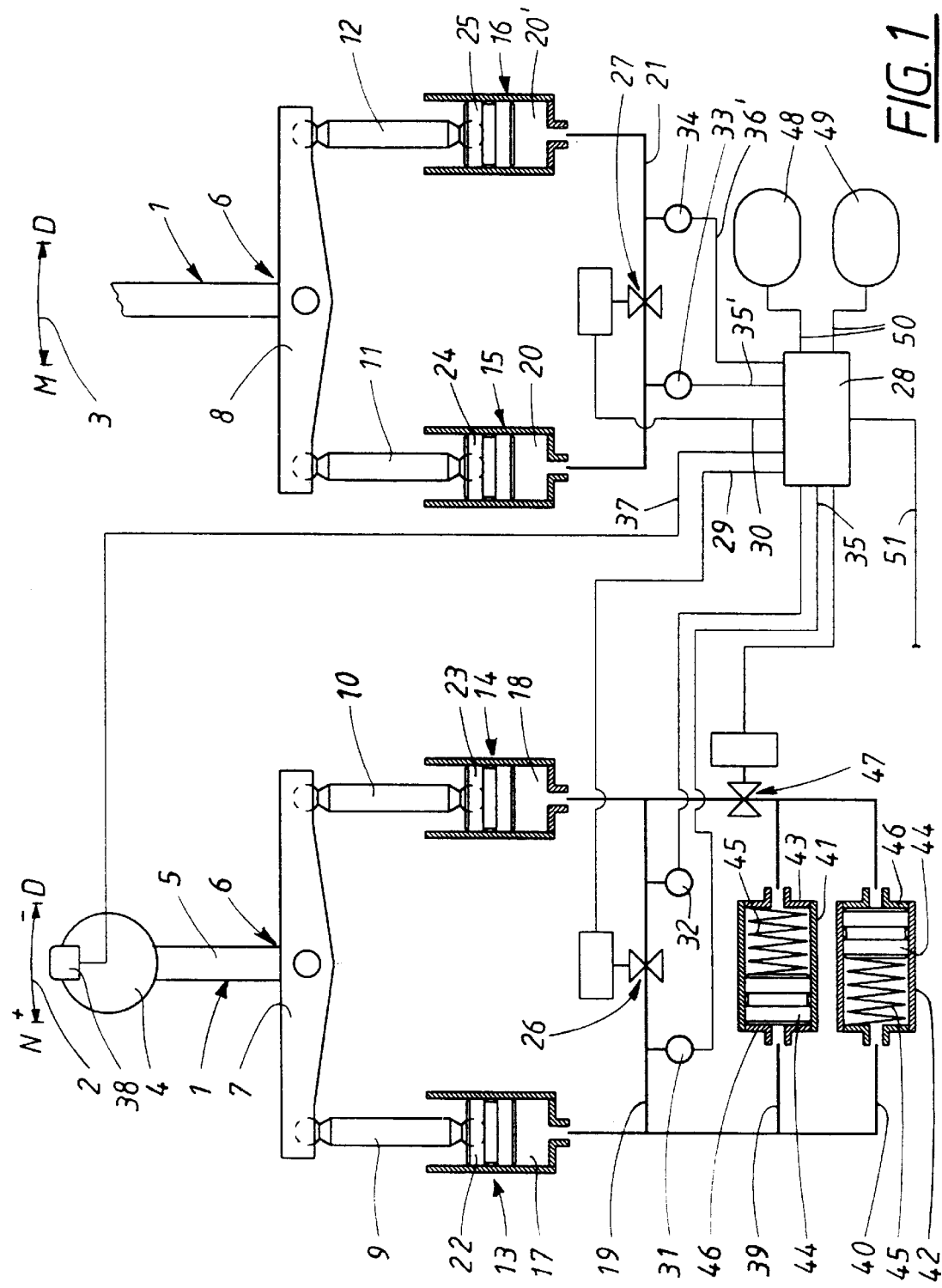
FIG. 1 is a diagrammatic representation of one embodiment of the maneuvering apparatus according to the present invention.
Figure 2:
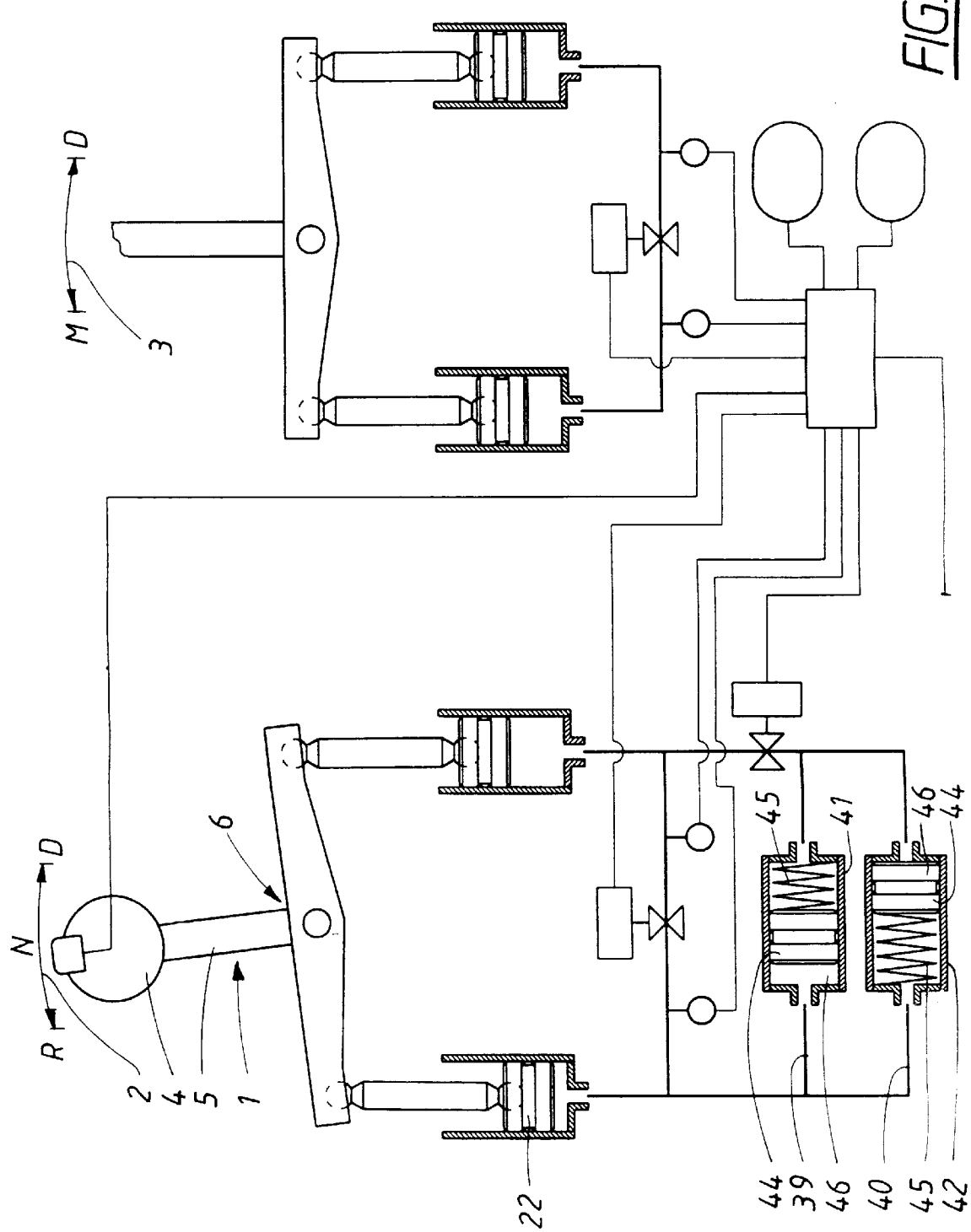
FIG. 2 is a diagrammatic representation of the embodiment of the maneuvering apparatus shown in FIG. 1 in a different position.
Figure 3:
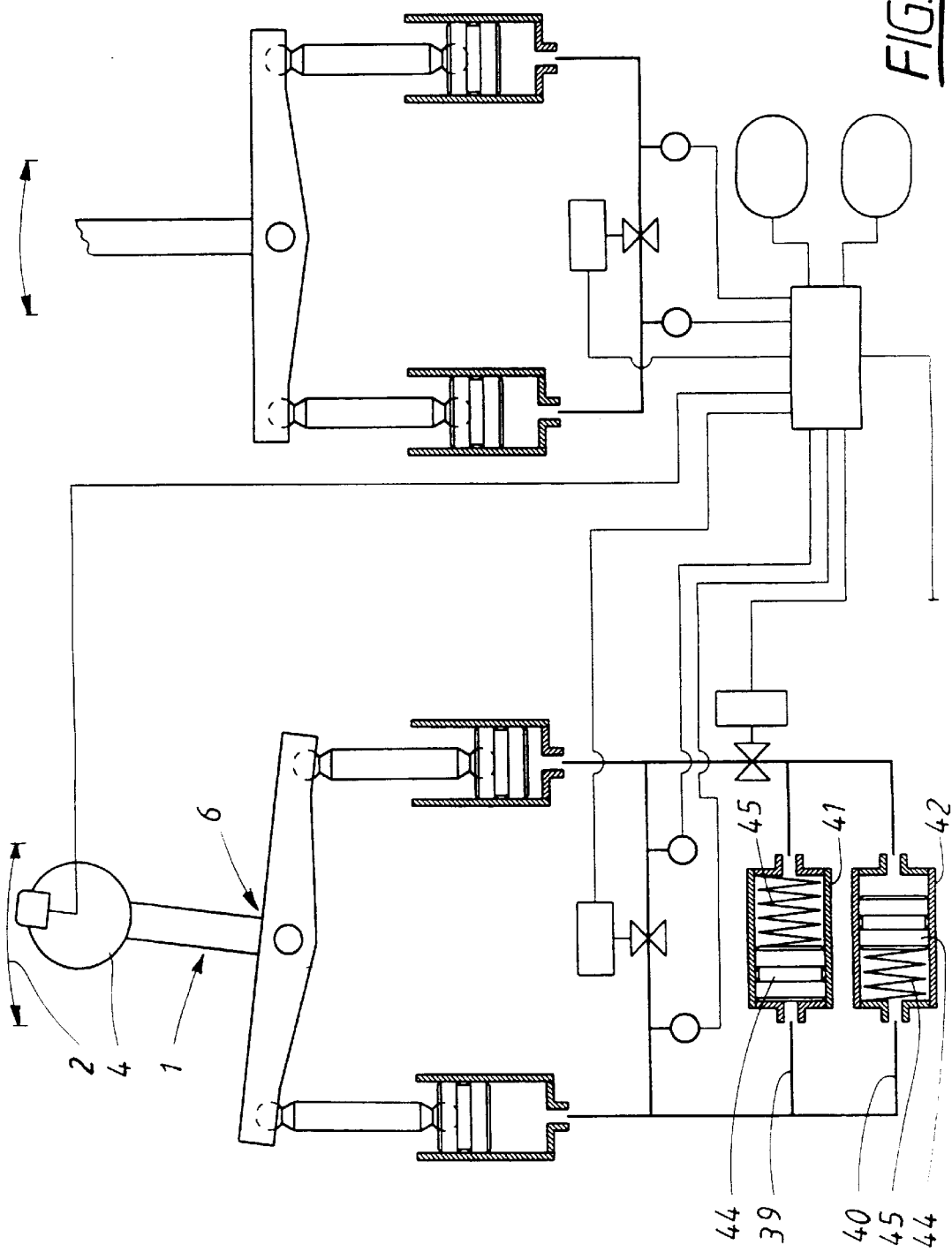
FIG. 3 is a diagrammatic representation of the embodiment of the maneuvering apparatus shown in FIG. 1 in yet a different position.
Figure 4:
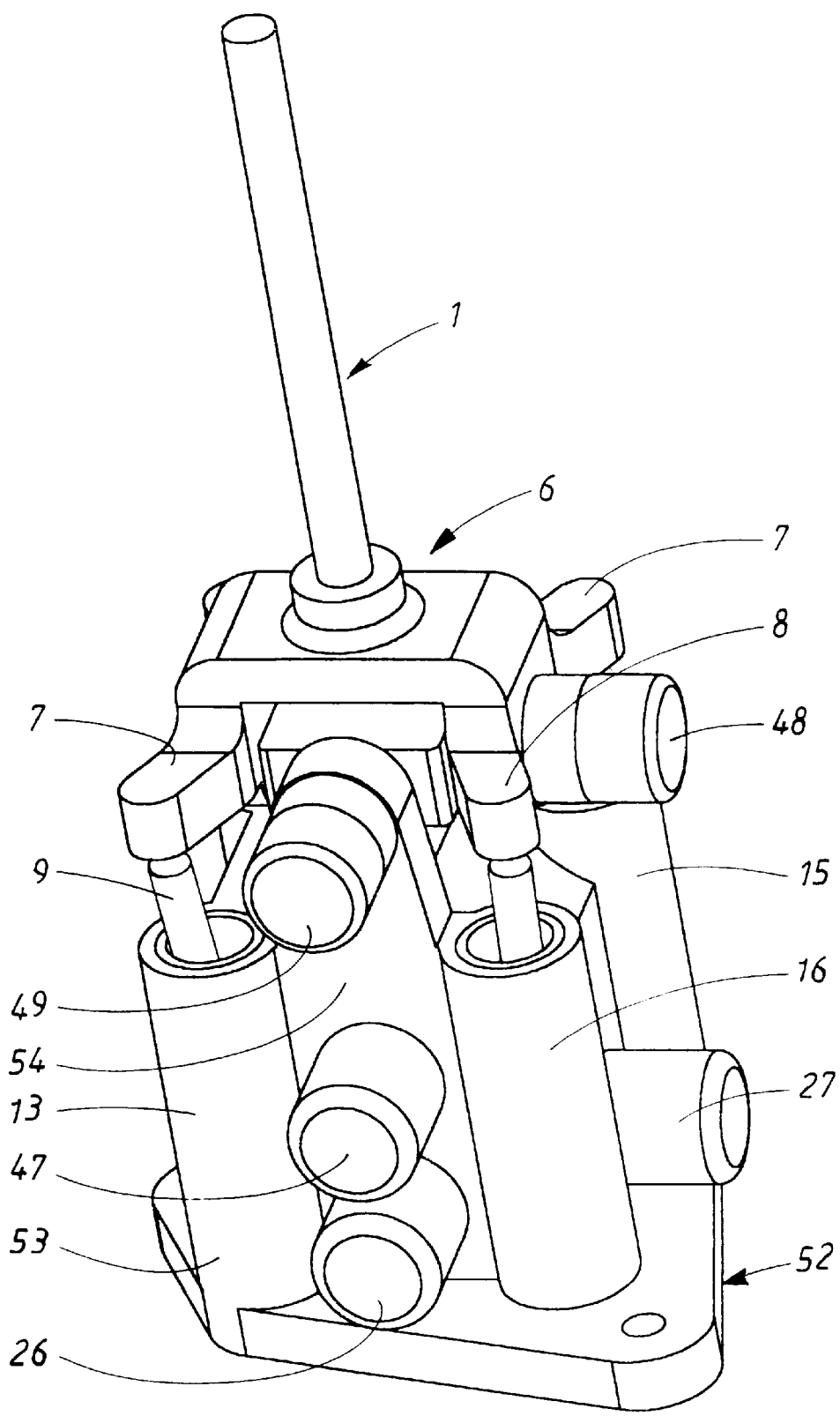
FIG. 4 is a front, perspective view of one embodiment of the maneuvering apparatus of the present invention.
Figure 5:
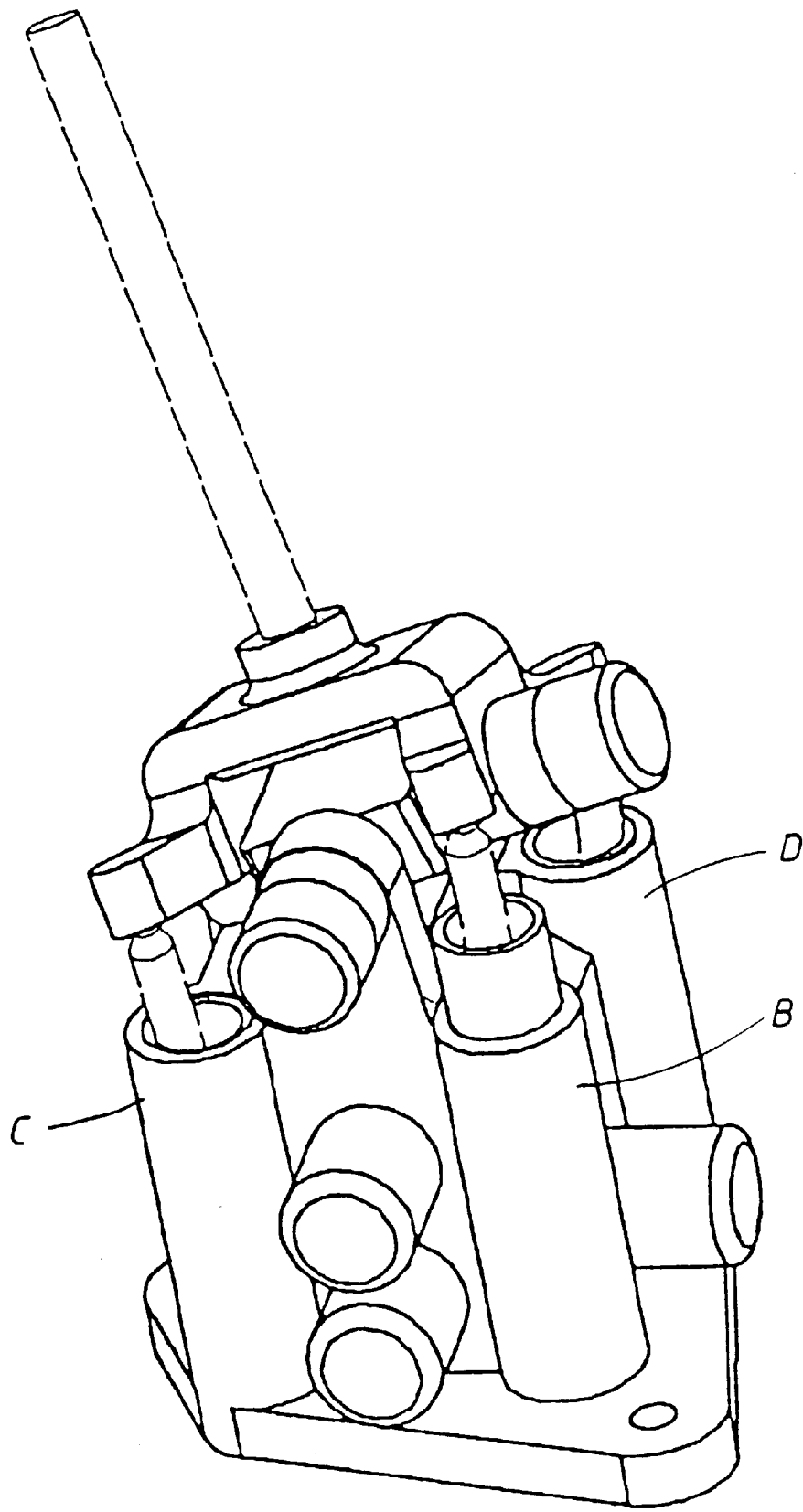
FIG. 5 is a front, perspective view of the embodiment of the maneuvering apparatus shown in FIG. 4 in a different position.
Figure 6:
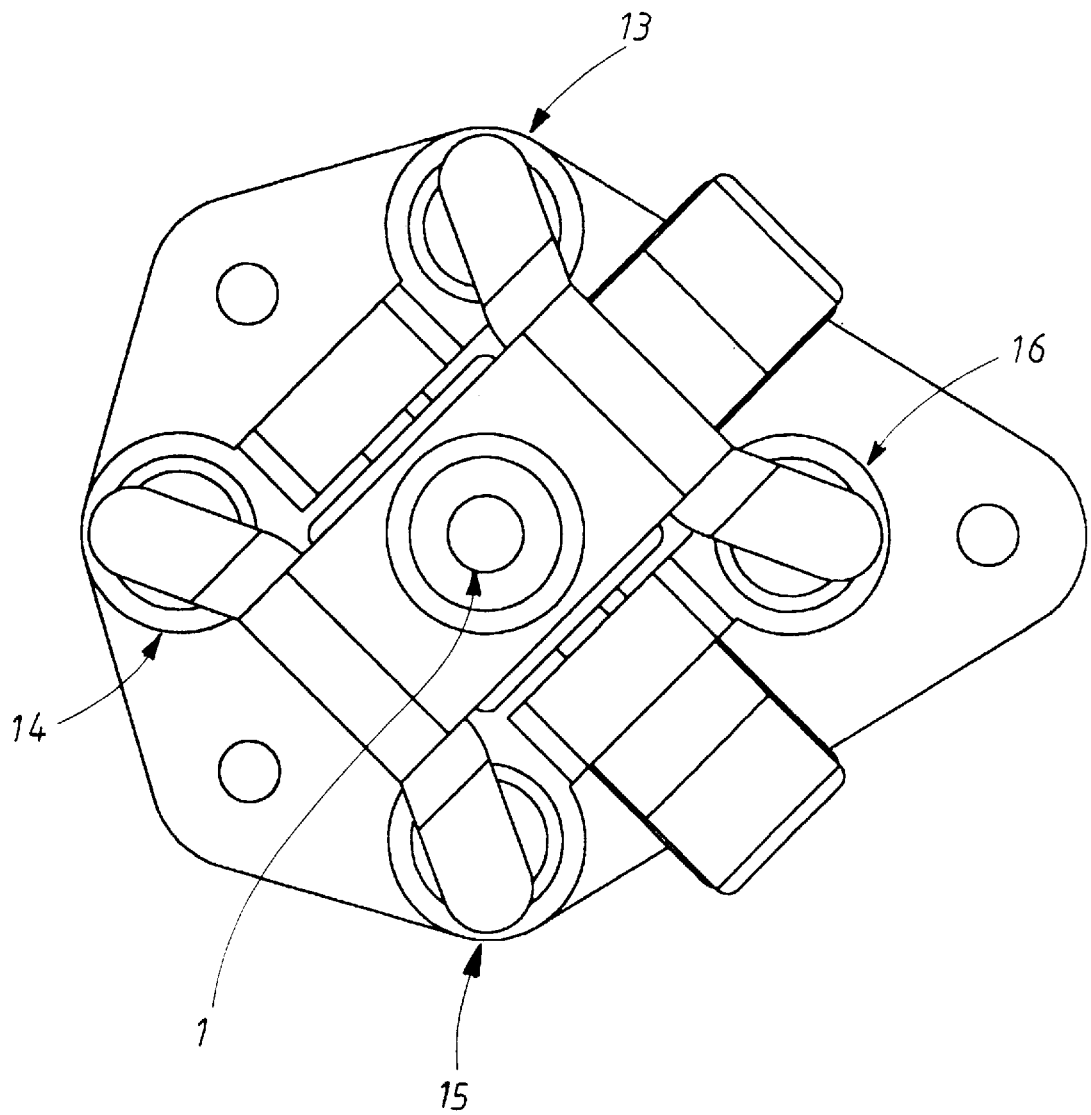
FIG. 6 is a top, elevational view of the embodiment of the maneuvering apparatus of the present invention shown in FIG. 4.

FIGS. 1–3 thus show an example of an application of the principle according to the present invention, in which the movement-limiting devices are a hydraulic system with hydraulic/piston cylinders as the movement-limiting devices. The maneuvering apparatus comprises, in a known manner, a maneuvering lever 1 which in the figure is shown diagrammatically from two directions, i.e. the two levers shown in the same figure are thus one and the same lever as viewed from two directions at right angles to each other. This is done in order to better illustrate the two directions in which the maneuvering lever in the embodiment shown therein is allowed to move under certain conditions upon application of the maneuvering apparatus as a gear control for an automatic transmission of a motor vehicle. These two main directions are the so-called shift direction for shifting the gear lever between different gear change stages, shown by double arrow 2, and the so-called select direction for selecting between different gear change types, represented by double arrow 3.

The gear lever has, in a conventional manner, a lever head generally denoted as a lever knob 4, intended to be gripped by the maneuvering person, i.e. the driver, in order to move the lever part 5 of the lever in the desired direction so as to obtain the desired function, i.e. the desired gear change position, in an arrangement which is maneuvered by the maneuvering apparatus, in this case the gearbox. The maneuvering lever 1 is mounted relative to the vehicle by means of a pivot hinge 6 which, in the example shown, is of the cardan suspension type with two axles set transverse to each other and arranged so that the hinge as such permits free pivoting movement of the gear lever in an unlimited number of directions or movement planes. Its practical construction will be described in more detail hereinbelow. The maneuvering lever 1 is thus rigidly connected to two lifting arms, 7 and 8, crosslaid at right angles and arranged, in the event of a pivoting movement of the maneuvering lever, to generate forward and backward movements of the piston rods, 9, 10, 11, and 12, in a number of hydraulic piston cylinders, 13, 14, 15, and 16, or alternatively to limit or block pivoting movements of the lever. For this purpose, the piston cylinders 13–16 are in communication with each other in pairs by means of two hydraulically separate hydraulics systems, more precisely in such a way that the cylinder chamber 17 in the piston cylinder 13 is arranged to be in communication with the cylinder chamber 18 through hydraulic line 19, while the cylinder chamber 20 is arranged to be in communication with the cylinder chamber 20' by means of a hydraulic line 21. The cylinder chambers, 17 and 18 and 20 and 20', respectively, are identical pairs, so that one and the same volume of hydraulic fluid is transported in the closed hydraulics system between the two chambers according to the position of the respective pistons, 22, 23, 24, and 25, in the piston cylinders.

In the communication line, 19 and 21, between the piston cylinders, 13, 14, 15, and 16, of each pair there is arranged, according to the present invention, a flow-limiting or blocking member, 26 and 27, i.e. a valve which is electrically controlled, for example a solenoid valve. This is advantageously intended not only for on/off regulation, but also to be controlled stepwise, i.e. in analog fashion, or in small steps, in which analog or digital control can be used.

The system includes an electrical control unit 28 in the form of a computer which is arranged to control the two valves, 26 and 27, by means of their respective control output, 29 and 30, as a function of incoming control signals at a number of inputs to the control unit.

According to the present invention, a number of sensors are included which are arranged to detect the maneuvering person applying a force on the maneuvering lever 1 in a certain direction in order to control the system such that this selected movement can be allowed if it lies within a programmed, established movement pattern. In the example shown, this is achieved by means of a number of pressure sensors which, in the example shown, consist of two pressure sensors, 31 and 32, for the hydraulics system for shift movements and two pressure sensors, 33 and 34, for the hydraulics system for select movements. The pressure sensors are situated on both sides of associated flow limiters, 26 and 27, and are arranged to detect the maneuvering force in the lever 1 in a certain direction by detecting the pressure in the respective hydraulic line, 19 and 21, as a function of the state of the flow limiters. The control unit 28 has an input, 35 and 36, for each sensor and controls the valves, 26 and 27, so that the selected movement is permitted with the above-mentioned proviso, namely on condition that it lies within the established movement pattern. A further condition for permitting movement of the lever is an approved position. This is detected by position sensors which are described in more detail hereinbelow. A further control input 37 leads to the control unit 28 from a switch 38 arranged in the maneuvering lever knob 4, which switch 38 represents a lock that can be released by the driver, for example a lock for locking against unintentional movements in a certain direction. The established movement pattern is input as a control program in the control unit 28, which controls the flow limiters, 26 and 27, and thereby the movements of the lever.

In the example shown, an alternative maneuvering function is included, in which the maneuvering lever can be permitted to spring back to a certain position, which represents a netrual position, from a movement forwards or backwards in the example shown in the shift direction, according to the double arrow 2. This is acheived by means of the hydraulics system comprising two parallel circuits, 39 and 40, each of which has double-acting piston/cylinders, 41 and 42. These each have a piston 44 which is spring-loaded by a compression spring 45 in mutually opposite directions and which divides the cylinder into two chambers, 43 and 46. These two parallel circuits can be coupled in simultaneously by means of a valve 47 which is closed when changing gear according to the ordinary gear change type, but which is switched to the open position by means of a signal from the control unit 28 which, for example, can be activated by a switch, at the same time as the valve 26 is closed.

In the alternative maneuvering function or maneuvering mode, when the lever 5 is situated in the neutral position, as is shown in FIG. 1, the two pistons 44 in the piston cylinders, 41 and 42, are prestressed towards their end positions by their respective springs 45. When the lever 5 is pushed forwards by the person maneuvering it (see FIG. 2), the piston 22 is pressed downwards, whereupon hydraulic fluid is forced through line 39 into the cylinder 41 and displaces the piston 44 counter to the action of the spring 45. By way of position sensor 48, a position signal is sent to the control unit 28 concerning the position of the lever 1 for a control command to the gearbox to change up a gear for each swing movement. The spring returns the piston to its starting position and thus the lever to the neutral position as soon as the maneuvering force on the lever ceases.

With the piston in its end position in the second piston cylinder 42, the flow in the associated hydraulic line 40 is blocked until the lever 5 is moved from the neutral position backwards to the position shown in FIG. 3 for changing down gear. In this case, the piston 44 in the piston cylinder 42 is instead displaced counter to the action of its spring 45, and the control unit 28 receives a position signal from the position sensor 48 which in turn gives a control command to the gearbox for changing down.

In order to create distinct maneuvering positions for the lever 1, the control unit 28 can be pre-programmed for controlling the valve or valves, 26 and 27, as a function of the lever position, not only for controlling the movement direction. For example, it is possible to create force thresholds for movements between all positions, and in addition higher force thresholds between certain positions, for example for a reverse position, for creating distinct lever positions and avoiding unintentional movements.

The system described above thus has the purpose of controlling the maneuvering movements of the gear lever, which is mechanically mounted in its pivot hinge 6 for an unlimited number of movement directions. For controlling the lever and the gearbox, the arrangement is thus provided with the position sensors, 48 and 49, which consist, for example, of angle sensors on the maneuvering lever 1, in the example shown one sensor for each movement direction. The information on the position of the lever in the selected movement pattern is fed to the inputs 50 of the control unit, which at its main output 51 emits control instructions to, on the one hand, the flow limiters, 26, 27 and 47, and, on the other hand, the gearbox for gear changing, suitably by means of the main computer of the vehicle.

FIGS. 4–8 show an example of a practical design of the maneuvering apparatus according to the present invention. It will be seen therefrom that the maneuvering lever 1 of the maneuvering apparatus is mounted with respect to the pivot hinge 6 so as to pivot in a maneuvering console 52 which bears the piston cylinders 13–16. These are arranged with their cylinders 53 in the console and are coupled to the lifting arms, 7 and 8, by means of their piston rods 9–12. In the example shown, the pivot hinge 6 is mechanically designed as a joint cross with the lever 1 pivotably mounted about a first axle 56, which is in turn pivotably suspended in a transverse axle 57 mounted in two console arms, 54 and 55, in the maneuvering console 52. The position sensors, 48 and 49, are arranged on the two crosslaid axles of the pivot hinge 6. The flow limiters, 26, 27 and 47, are mounted on one of the two console arms, 54 and 55.

Figure 7:
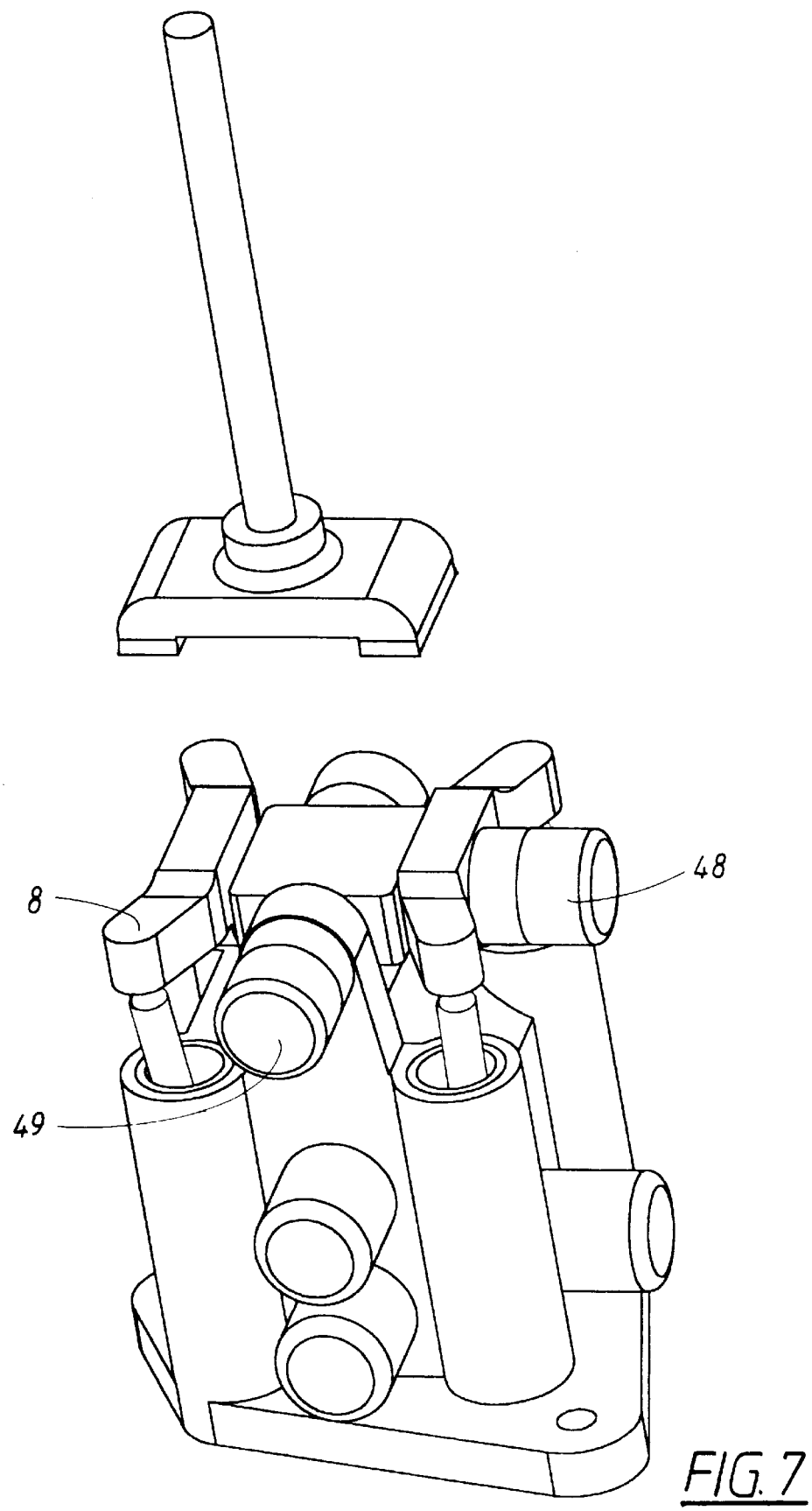
FIG. 7 is a front, perspective, partially cut-away exploded view of the embodiment of the maneuvering apparatus of the present invention shown in FIG. 4.
Figure 8:
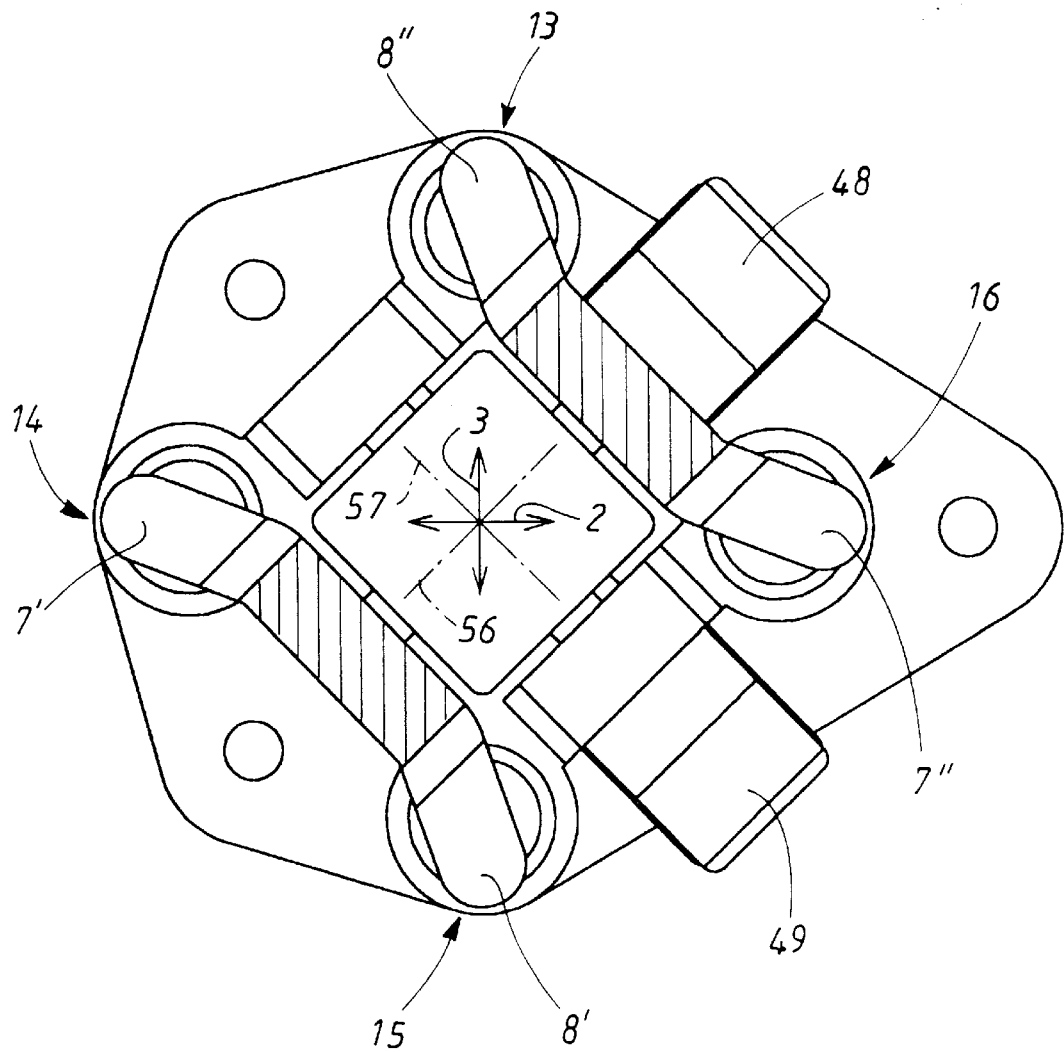
FIG. 8 is a top, elevational view of the lower portion of the embodiment of the maneuvering apparatus shown in FIG. 7.

As is illustrated in FIG. 7, a portion of the joint cross is shown cut away for the sake of clarity so that, as shown in FIG. 8, the geometric configuration is clearer. It can thus be seen that the shift direction 2 and the select direction 3 extend at 45° angles relative to the two pivot axles, 56 and 57, of the pivot hinge 6. It will be appreciated that in this example the lifting arms, 7 and 8, are represented by diagonally situated arm portions, 7', 7", 8', and 8", in the joint cross.

Figure 9:
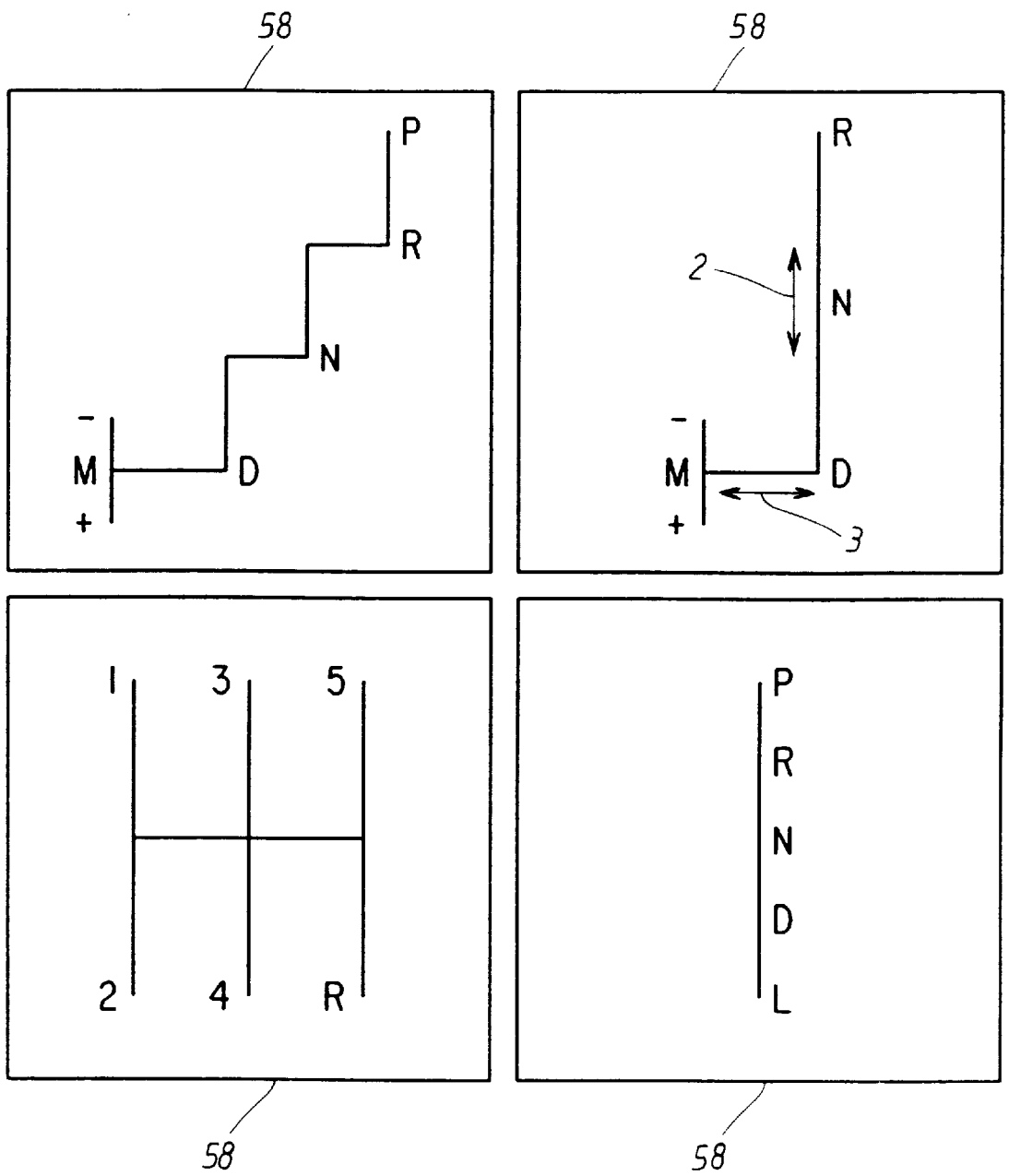
FIG. 9 are diagrammatical representations of four different movement patterns which can be achieved using the maneuvering apparatus of the present invention.

As is illustrated in FIG. 9, the arrangement according to the present invention can be used to create an unlimited number of movement patterns by programming the control unit 28 within an outer frame of movement which is shown diagrammatically in the figure by a margin line 58 around each illustrated pattern. The movement pattern can, for example, have a step ladder shape with, therefore, gear changing between shift and select movements for each gear change position including a special position for the alternative gear change type with spring return to a neutral position M from a plus position with changing up for each lever movement and a minus position for changing down for each lever movement. Alternatively, the movement pattern can have essentially an L shape, with addition of the special spring return movement or, as in manual gearboxes, a pattern similar to a double H, or alternatively a completely rectilinear movement pattern. The movement pattern does not have to be rectilinear, but instead curved movement patterns are also possible by means of controlling the flow limiters.

In the case of a maneuvering apparatus programmed for a movement pattern with an L shape, see FIG. 9, i.e. a rectilinear shift movement in a first gear change mode and a laterally directed select movement for a second mode, the following takes place. When the lever 1 is situated in the N position (neutral position) and is not activated by any maneuvering force, all of the flow limiters, 26, 27 and 47, are closed. A maneuvering force in the direction towards the R position (reverse) which is detected by the pressure sensors, 31 and 32, combined with a separate activation signal initiated by the switch 38 on the lever knob 4, sends a signal to the flow limiter 26 for opening. The driver is allowed to move the lever 1 to the R position and, when the R position has been reached, the flow limiter 26 is closed by a signal from the position sensors, 48 and 49, as a result of which the maneuvering lever is locked against continued movement. In the case of a maneuvering force in the opposite direction, which is detected by the pressure sensors, 31 and 32, the flow limiter 26 opens first partially and then completely, which provides a threshold effect, i.e. a resistance that has to be overcome. When the N position has been reached, which is detected by the position sensors, a signal is emitted from them to the flow limiter 26, which is again throttled and creates a certain resistance to continued movement, which in the case of a maneuvering force for movement to the D position (drive position) is reduced by opening of the flow limiter 26, until the D position has been reached. The position is detected by the position sensors, 48 and 49, which by means of the control unit 28 close the flow limiter 26, whereupon the lever 1 is locked against continued shift movement in the same direction.

In the D position, the flow limiter 27 is instead opened at first partially in the case of a maneuvering force in the select direction, by detection of the hydraulic pressure by means of the pressure sensors, 33 and 34, which by means of the control unit 28 emit a signal to the flow limiter, and then completely in order to allow the select movement in the direction of the arrow 3 for switching to the alternative gear change mode. When the M position has been reached, the flow limiter 27 is closed, whereupon the lever is locked against continued select movement in the same direction. In the M position, the flow limiter 26 is kept continuously closed, while at the same time the flow limiter 47 is opened by means of a signal from the control unit 28, which is controlled by the position sensors, 48 and 49, and the pressure sensors, 31 and 32. The flow is thus opened to the piston cylinders, 41 and 42, arranged in parallel but the opposite way round.

With a maneuvering force in the shift direction, in this case in the direction from the M position to the − or + position, the hydraulic flow is forced into one or other of the piston cylinders, 41 and 42, counter to the action of associated springs 45 which have been described above. In this movement too, the lever movement is limited by the position sensors.

The present invention is not limited to the illustrative embodiment described above and shown in the drawing, but instead can be varied within the scope of the attached claims. For example, the system described above can be realized by means of electrical setting devices, for example servo-controlled ball and nut bolts with position sensors which are combined with force sensors, for example strain gauges, which are applied at a suitable location, for example the maneuvering lever, in order to detect the applied maneuvering force. The force sensors should be of the analog type for analog control of the setting devices for a proportioned maneuvering movement. The term analog is in this context also meant to include the technique of simulating an analog technique using a digital technique in small steps.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for the control of the operational states of a device comprising a maneuvering console including a maneuvering lever, a pivot hinge for said maneuvering lever whereby said maneuvering lever can be actuated into a plurality of positions corresponding to said operational states of said device, said pivot hinge being mounted to permit pivoting of said maneuvering lever with respect to said maneuvering console about an unlimited number of spatial pivot axes, a plurality of controllable units comprising at least two hydraulic pistons and cylinders, a first hydraulic line connecting said at least two hydraulic pistons and cylinders and a first flow limiter disposed in said first hydraulic line, said maneuvering lever being mechanically coupled to each of said at least two hydraulic pistons and cylinders, whereby said pivoting movement of said maneuvering lever is converted into reciprocal movement of said hydraulic pistons within said cylinders, a plurality of sensors for detecting a maneuvering force applied to said maneuvering lever and the position of said maneuvering lever, whereby said pivoting movement of said maneuvering lever can be selectively limited by said plurality of controllable units based upon said detections, and a controller for controlling said plurality of controllable units thereby permitting selected movement of said maneuvering lever based on control conditions set by said controller.

2. The apparatus of claim 1 wherein said plurality of controllable units comprises four hydraulic pistons and cylinders, and including a second hydraulic line connecting at least two other of said hydraulic pistons and cylinders, a second flow limiter disposed in said second hydraulic line, and a joint cross for mechanically coupling said maneuvering lever to said four hydraulic pistons and cylinders, said joint cross being mounted with respect to said maneuvering console for pivoting about a pair of pivot axes set at right angles with respect to each other.

3. The apparatus of claim 2 wherein said plurality of sensors includes a plurality of position sensors for detecting the position of said maneuvering lever and a plurality of pressure sensors for detecting the hydraulic pressure in said first and second hydraulic lines on both sides of said first and second flow limiters.

4. The apparatus of claim 1 including a pair of hydraulic control cylinders coupled in parallel to each other and connected to said first hydraulic line, and a pair of spring-loaded control pistons disposed within said pair of hydraulic control cylinders in opposite directions, whereby said maneuvering lever can be switched between a first mode and a second mode wherein said maneuvering lever can be automatically set to a neutral position.

5. Apparatus for the control of the operational states of the gears in a gearbox comprising a maneuvering console including a maneuvering lever, a pivot hinge for said maneuvering lever whereby said maneuvering lever can be actuated into a plurality of positions in order to obtain said operational states of said gearbox, said pivot hinge being mounted to permit pivoting of said maneuvering lever with respect to said maneuvering console about an unlimited number of spatial pivot axes, a plurality of controllable units mechanically coupled to said maneuvering lever for selectively limiting said pivoting movement of said maneuvering lever, a plurality of sensors for detecting a maneuvering force applied to said maneuvering lever for a selected movement in a predetermined direction and the position of said maneuvering lever, whereby said pivoting movement of said maneuvering lever can be selectively limited by said plurality of controllable units based upon said detections, and a programmable computer for controlling said plurality of controllable units thereby permitting selected movement of said maneuvering lever based on selected control conditions set by said programmable computer.

* * * * *